US007881390B2

(12) United States Patent
Sadowsky et al.

(10) Patent No.: US 7,881,390 B2
(45) Date of Patent: Feb. 1, 2011

(54) INCREASED DISCRETE POINT PROCESSING IN AN OFDM COMMUNICATION SYSTEM

(75) Inventors: John Sadowsky, Mesa, AZ (US); Alexander A. Maltsev, Nizhny Novgorod (RU); Vadim S. Sergeyev, Nizhny Novgorod (RU); Alexei V. Davydov, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 1390 days.

(21) Appl. No.: 11/291,800

(22) Filed: Nov. 30, 2005

(65) Prior Publication Data

US 2006/0115012 A1 Jun. 1, 2006

Related U.S. Application Data

(60) Provisional application No. 60/632,735, filed on Dec. 1, 2004.

(51) Int. Cl.
*H04K 1/10* (2006.01)
(52) U.S. Cl. ...................................... 375/260
(58) Field of Classification Search ......... 375/259–260, 375/295, 299, 316; 370/208, 210
See application file for complete search history.

(56) References Cited

U.S. PATENT DOCUMENTS

| 5,666,383 | A  | * | 9/1997  | Huang et al. ............... 375/260 |
| 6,252,909 | B1 | * | 6/2001  | Tzannes et al. ............. 375/260 |
| 6,456,654 | B1 | * | 9/2002  | Ginesi et al. ............... 375/229 |
| 6,631,175 | B2 | * | 10/2003 | Harikumar et al. .......... 375/350 |
| 6,985,434 | B2 | * | 1/2006  | Wu et al. .................... 370/208 |
| 7,366,250 | B2 | * | 4/2008  | Mujtaba et al. ............. 375/267 |
| 7,474,608 | B2 | * | 1/2009  | Stephens et al. ............ 370/203 |
| 2004/0004936 | A1 |   | 1/2004  | Ginesi et al. |
| 2006/0067415 | A1 | * | 3/2006  | Mujtaba ..................... 375/260 |

FOREIGN PATENT DOCUMENTS

| EP | 0841 762 A2 | 5/1998 |
| EP | 0841 762 A3 | 3/2001 |
| JP | 10336141 | 12/1998 |
| TW | 00260852 | 10/1995 |
| TW | 00589818 | 6/2004 |
| TW | I221980 | 10/2004 |
| TW | 223516 | 11/2004 |
| WO | WO/03079594 | 9/2003 |

OTHER PUBLICATIONS

U.S. Appl. No. 60/608,472, filed Sep. 9, 2004, "Pilot Design For MIMO Transmission".*

(Continued)

*Primary Examiner*—Khanh C Tran
(74) *Attorney, Agent, or Firm*—Blakely, Sokoloff, Taylor & Zafman LLP (57) ABSTRACT

Methods and apparatus provide increased symbol length with more subcarriers in a fixed-bandwidth system. The subcarriers spacing may be reduced to provide increased symbol length and enable higher throughput. In one implementation, a system compatible with the IEEE P802.11n proposal can use 128 subcarriers in 20 MHz operation to provide increased throughput in lower-bandwidth channel operation.

20 Claims, 6 Drawing Sheets

OTHER PUBLICATIONS

IEEE P802.11 Wireless LANs, "TGn Sync Proposal Technical Specification", May 18, 2005, p. 1-130, Document ID IEEE 802.11-04/0889r6.

Homayoun Nikookar et al., "Multicarrier Transmission With Nonuniform Carriers in a Multipath Channel", *Proceedings 5th IEEE International Conference on Universal Personal Communications*, Cambridge, MA, Sep. 29-Oct. 2, 1996, p. 628-632, vol. 2, No. 29, Sep. 1996, IEEE, New York, NY, ISBN: 0-7803-3300-4.

Richard Van Nee et al., "OFDM For Wireless Multimedia Communications", Jan. 1, 2000, Chpt. 2.3 Guard Time and Cyclic Extension, p. 39-42, Artech House Publishers, XP002371815.

PCT International Search Report and Written Opinion, PCT Application No. PCT/US2005/043956, filed Jan. 12, 2005, 13 pages.

Int'l Application No. PCT/US2005/043956 filed Dec. 1, 2005; Int'l Preliminary Report on Patentability dated Jun. 14, 2007.

Office Action for Taiwan Patent Application No. 94142250 dated Dec. 2, 2008 (1 page).

* cited by examiner

INCREASED DISCRETE POINT PROCESSING IN AN OFDM COMMUNICATION SYSTEM

RELATED APPLICATION

This application claims the benefit of priority to U.S. Provisional Application No. 60/632,735, filed Dec. 1, 2004.

FIELD

Embodiments of the invention relate to wireless communication systems, and more particularly to wireless, multi-carrier communication systems.

BACKGROUND

An OFDM (orthogonal frequency division multiplexing) system provides enhanced operation over existing Wi-Fi (Wireless Fidelity) wireless channels while maintaining a certain level of compatibility with existing Wi-Fi (e.g., IEEE (Institute of Electrical and Electronics Engineers) Std. 802.11a, 1999 (the "802.11a standard"), IEEE Std. 802.11g, Jun. 27, 2003 (the "802.11g standard"), which may collectively be referred to herein as "existing Wi-Fi") systems. Next generation Wi-Fi developments seek to increase the capabilities of wireless local area networks (WLANs), and may be based on, or otherwise compatible with the proposal IEEE P802.11n, May 2005 (referred to herein as "next-generation Wi-Fi").

The development of both existing and next-generation Wi-Fi networking aims to increase data throughput. The main enabling technologies for next-generation Wi-Fi systems to achieve increase data throughput are the use of several existing Wi-Fi channels in parallel, and the use of MIMO (multiple-input, multiple-output) techniques. However, another goal of next-generation Wi-Fi networking is backward compatibility at the physical layer (PHY) with existing Wi-Fi systems. Backward compatibility reduces or prevents the destruction of operation of existing (legacy) Wi-Fi networks by the introduction of MIMO OFDM. Using the MIMO technique is not in conflict with existing Wi-Fi PHY protocol, enabling both existing and next-generation Wi-Fi systems to coexist.

One problem with exploiting several existing Wi-Fi channels in parallel is that backward compatibility traditionally requires that the use of multiple frequency channels only be allowed in a "pure" scenario, where the network consists only of next-generation Wi-Fi devices. In a "mixed" scenario, where the network includes both existing and next-generation Wi-Fi devices, only the use of single frequency channels is allowed, significantly reducing the potential throughput of next-generation devices in mixed networks. Specifically, existing Wi-Fi systems assume the use of 64 subcarriers (52 of which are used for data transmission) in 20 MHz channels, whereas next-generation devices can use 128 subcarriers (108 of which are used to transmit data) in 40 MHz channels. The next-generation devices are thus required to significantly reduce potential throughput for purposes of backward compatibility.

BRIEF DESCRIPTION OF THE DRAWINGS

The following description includes discussion of various figures having illustrations given by way of example of implementations of embodiments of the invention. The drawings should be understood by way of example, and not by way of limitation.

DETAILED DESCRIPTION

As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive. Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

An OFDM (orthogonal frequency division multiplexing) system provides enhanced operation over existing Wi-Fi (Wireless Fidelity) wireless channels while maintaining a certain level of compatibility with existing Wi-Fi (e.g., IEEE (Institute of Electrical and Electronics Engineers) Std. 802.11a, 1999 (the "802.11a standard"), IEEE Std. 802.11g, Jun. 27, 2003 (the "802.11g standard"), which may collectively be referred to herein as "existing Wi-Fi") systems. An enhanced OFDM system as described herein provides enhanced operation over existing Wi-Fi and next-generation Wi-Fi systems (e.g., proposal IEEE P802.11n, May 2005 (the "next-generation Wi-Fi")). Because the techniques described herein can be implemented in a manner compatible with next-generation Wi-Fi, a system using the enhancements suggested herein may also be referred to as "next-generation Wi-Fi." One implementation of embodiments of the invention may include use as a part of or as an enhancement to the 802.11n proposal. Reference is made herein to 802.11a/g systems and 802.11n systems, which is to be understood as examples of system in which the techniques described herein may be used. Embodiments of the invention could apply to other multi-carrier communication systems. The standards and proposals described as examples herein may be considered to be wireless communication protocols, having definitions or descriptions or suggestions to set forth how components of the system should interact, and how the components may function. The descriptions herein may apply to other wireless communication protocols.

The frame starts with the portion of legacy (802.11a/g) frame necessary for legacy devices to detect the packet transmission and for both legacy and 802.11n devices to perform necessary acquisition and estimations such as frequency offset, timing, signal strength, etc.

Next-generation Wi-Fi systems assume the use of a total of 64 subcarriers (52 of which are used for data transmission) in 20 MHz channels, and a total of 128 subcarriers (108 of which are used to transmit data) in 40 MHz channels. Next-generation Wi-Fi systems further assume the use of 40 MHz channels in a "pure" scenario, where a network includes only of next-generation Wi-Fi devices, or devices compatible with the 802.11n standard. In a "mixed" scenario where a network includes both next-generation and existing Wi-Fi devices, existing OFDM systems assume that devices compatible with 802.11n operate in 20 MHz channels using 64 subcarriers, rather than the 40 MHz channels defined in the 802.11n proposal.

The lower channel widths (20 MHz) used for compatibility with existing Wi-Fi devices in mixed systems were thought to render next-generation Wi-Fi devices incapable of utilizing the higher subcarrier count (128), higher throughput mechanisms available when used in higher channel widths (e.g., 40 MHz). Modifications of the 802.11n standard allow the use of 128 subcarriers in 20 MHz channels. The subcarrier spacing can be reduced, and more subcarriers introduced to increase the length of a communication symbol. In one embodiment subcarrier spacing is reduced by half, and the number of subcarriers is doubled, to effectively double an OFDM symbol length. In one embodiment, an OFDM guard interval can be reduced in length to further improve spectrum use and increase throughput.

Figure 1:
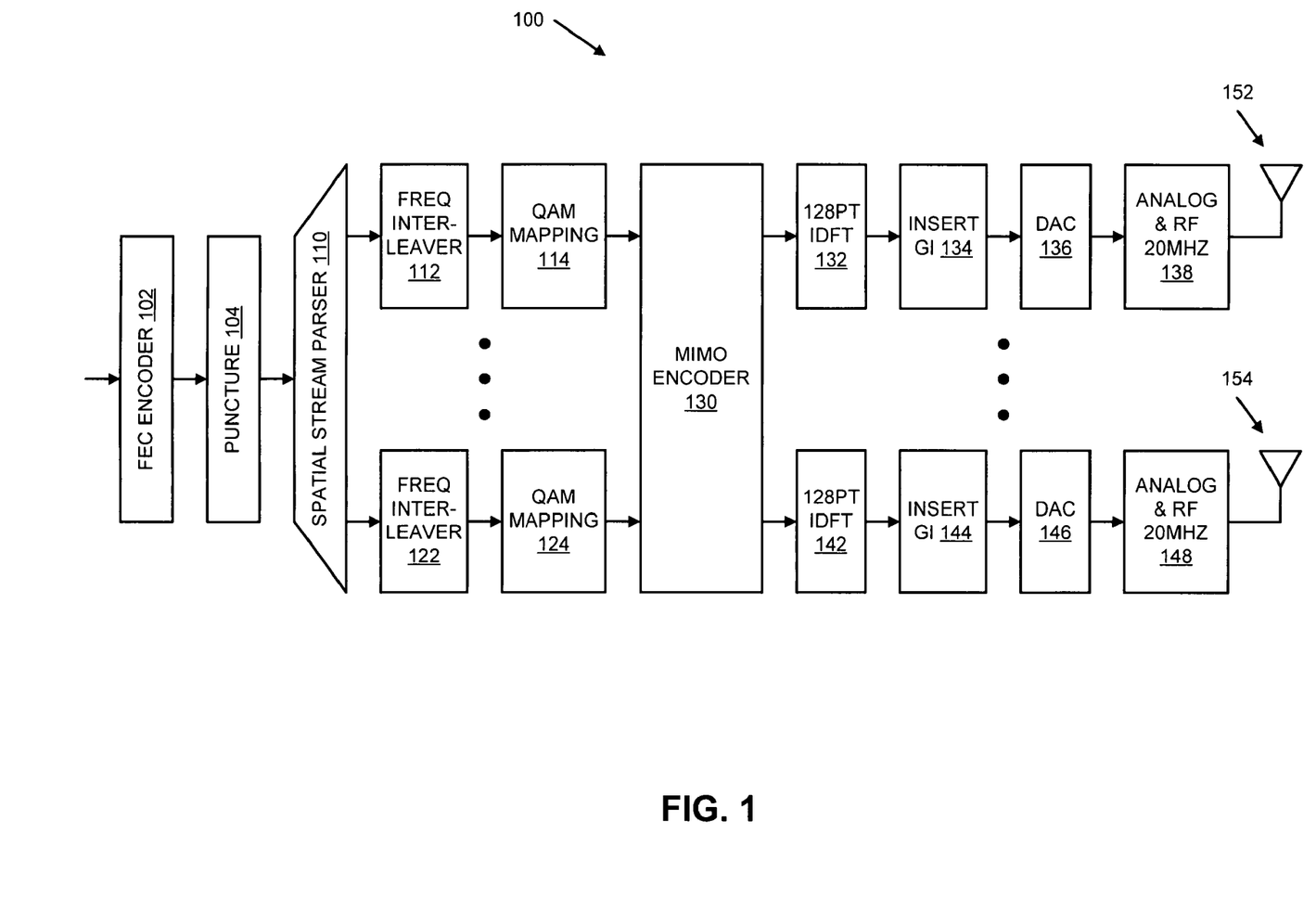
FIG. 1 is a block diagram of an embodiment of a MIMO-OFDM transmitter architecture.

FIG. 1 is a block diagram of an embodiment of a MIMO-OFDM transmitter architecture. System 100 provides an architecture in which an orthogonal frequency division multiplexed (OFDM) system as described herein can operate. With the exception of differences mentioned herein, the architecture of system 100 may be identical or similar to that described in IEEE P802.11n, section 11 "MIMO-OFDM HT PHY Specification." A forward error correction (FEC) encoder 102 can provide initial encoding of a signal to be transmitted. For convolutional code (CC) architectures, the mother code rate is ½. Encoded bits may optionally be punctured at puncture 104 to produce code rates of ⅔, ¾, or ⅚. For low-density parity-check (LDPC) architectures, the different code rates are produced within the encoder and external puncturing may not be necessary. Following the encoding/puncturing of bits, the signal is forwarded to spatial stream parser 110 to separate bits of an output signal stream among multiple transmit paths, which could be for multiple separate channels over which the signal will be sent.

The separate portions of the output stream are processed through frequency interleavers 112 and 122. For each spatial stream, blocks of bits that map to a single OFDM symbol are interleaved by frequency interleavers 112 and 122. The interleaving may be referred to as "frequency interleaving" as bits are interleaved across subcarriers. In addition to frequency interleaving, frequency interleavers 112 and 122 may also interleave subcarrier QAM constellation points (for example, to provide increased robustness against channel errors. The number of subcarriers may be different than a standard number of subcarriers expected, or defined by a standard or proposal. For example, 128 subcarriers may be used in a scenario defined to use 64 subcarriers. Interleaving may be across all available subcarriers. The combination of spatial stream parser 110 and frequency interleaver 112 results in space-time interleaving.

The elements/components of FIG. 1 can be considered to be coupled with or to each other as depicted in the figure. The coupling of components may include physical coupling, communicative coupling, and/or electrical coupling. Thus, coupling may refer to direct physical interconnection, as well as indirect interconnection.

From frequency interleavers 112 and 122, interleaved bits are forwarded to QAM (Quadrature Amplitude Modulation) mapping 114 and 124, respectively, to be mapped to QAM constellation points. The mapping may be BPSK (Binary Phase-Shift Keying), QPSK (Quadrature Phase-Shift Keying), 16 QAM, 64 QAM or 256 QAM.

Note that multiple frequency interleavers and QAM mappers are possible in system 100. Two are shown, but the number could be greater. Thus, system 100 supports multiple-input multiple-output (MIMO). MIMO encoder 130 provides a first operation in an antenna map transformation. Multiple inputs can come into MIMO encoder 130, which sends streams out multiple paths to multiple antennas. The two paths may have a 128 point Inverse Discrete Fourier Transform (IDFT) 132, 142, an insert guard interval (GI) 134, 144, a digital to analog converter (DAC) 136, 146, and an analog and radio frequency (RF) 20 MHz converter 138, 148. In one embodiment the IDFT includes a number of points other than 128 (e.g., 256) that may be a multiple of 128 (the number of subcarriers). These respective paths provide information to transmit out antennas 152 and 154.

Transmit antennas 152-154 may be the same antennas used for receiving incoming signals. Transmit antennas 152-154 may be any type of antenna (e.g., dipole, dish, omnidirectional, etc.), and may be an array of antenna elements. After processing by MIMO encoder 130, antenna streams can be transformed from the frequency domain to the time domain by 128 point IFFTs 132 and 142. The increase in transform points allows for higher throughput in system 100. The signal can be further formed by the addition of a guard interval by insert GI 134 and 144. Digital conversion to analog signals may be performed by DACs 136 and 146, and the analog signals are then processed by analog and RF processors 138 and 148 to generate signals of legacy spectrum width of 20 MHz to be applied to transmit antennas 152-154.

Figure 2:
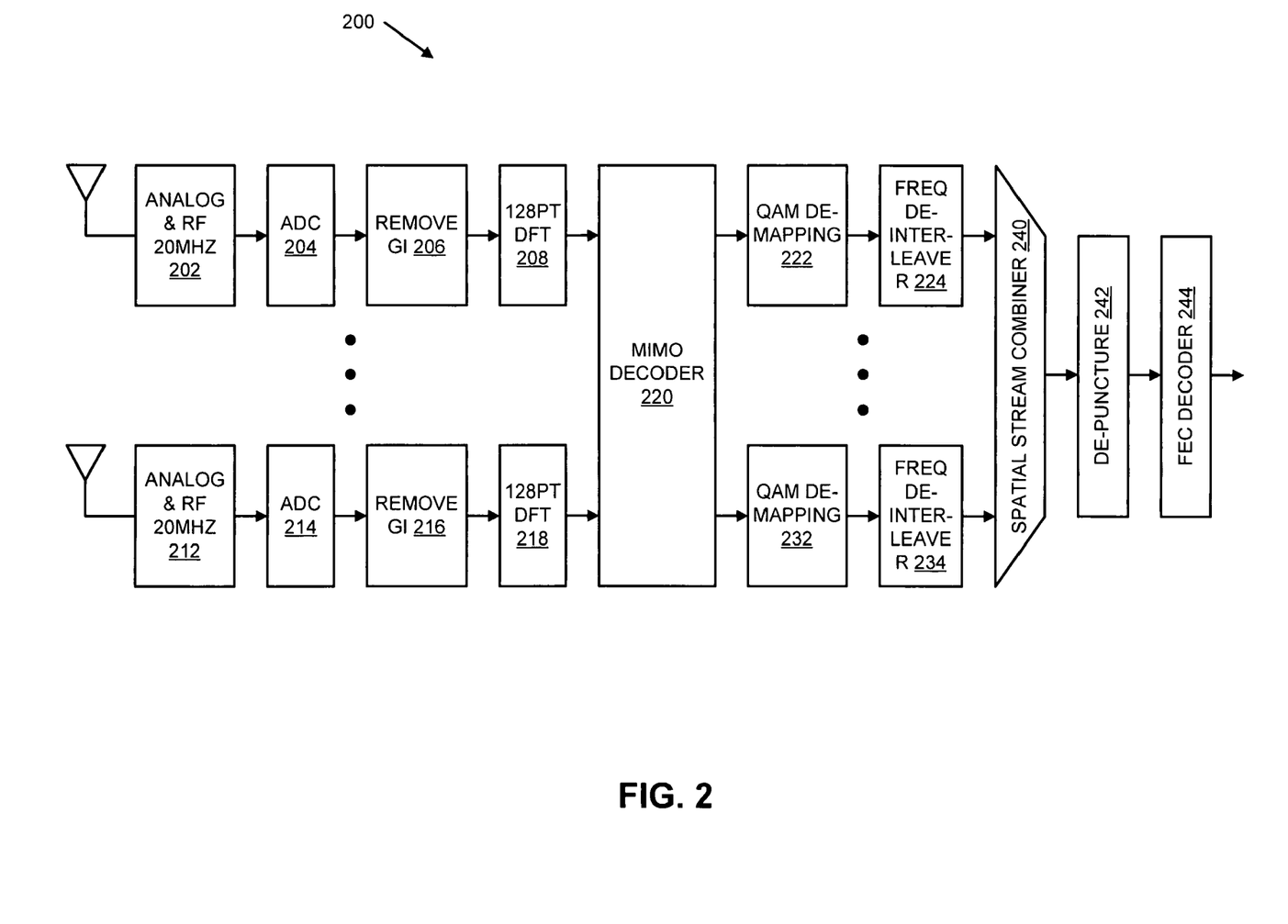
FIG. 2 is a block diagram of an embodiment of a MIMO-OFDM receiver architecture.

FIG. 2 is a block diagram of an embodiment of a MIMO-OFDM receiver architecture. In one embodiment, the operation of the elements of FIG. 2 is the reverse of the operations of FIG. 1. A signal is received at one or more antennas, and processed by analog and RF processors 202 and 212 operating in legacy spectrum width of 20 MHz. The received streams are converted with analog to digital converters (ADCs) 204 and 214 to produce a digital signal that includes discrete points representing the received signal. Remove GI blocks 206 and 216 represent the removal of guard intervals or other signal formatting to be removed prior to processing the received signals.

DFTs 208 and 218 (for example, a Fast Fourier Transform (FFT)) transform the received signals from the time domain to the frequency domain to extract information relative to processing the received signals. DFTs 208 and 218 can be 128 point DFTs, even though the operation occurs in a 20 MHz channel. The extension of the symbols of the received streams allows better spectrum use than traditional 64 point DFTs in 20 MHz channels. 128 point DFTs 208 and 218 provide the transformed signal streams to MIMO decoder 220 to de-map the signals from the antennas and allow QAM de-mapping blocks 222 and 232 to determine symbols from the stream. Frequency de-interleavers 224 and 234 to extract the individual subcarriers of the streams, which are sent to spatial stream combiner 240 for construction of spatial streams.

If puncturing is used in system 200, de-puncture 242 may be applied to produce a signal with a mother code rate for decoding by FEC decoder 244. From FEC decoder 244, the signal may be forwarded to upper layers of software for processing or other operation on the received signals. As with system 100 of FIG. 1, system 200 of FIG. 2 may function the same or similar to a system defined in the IEEE P802.11n proposal, and operating with a 128-point DFT (FIG. 2) or IDFT (FIG. 1) in 20 MHz.

Figure 3:
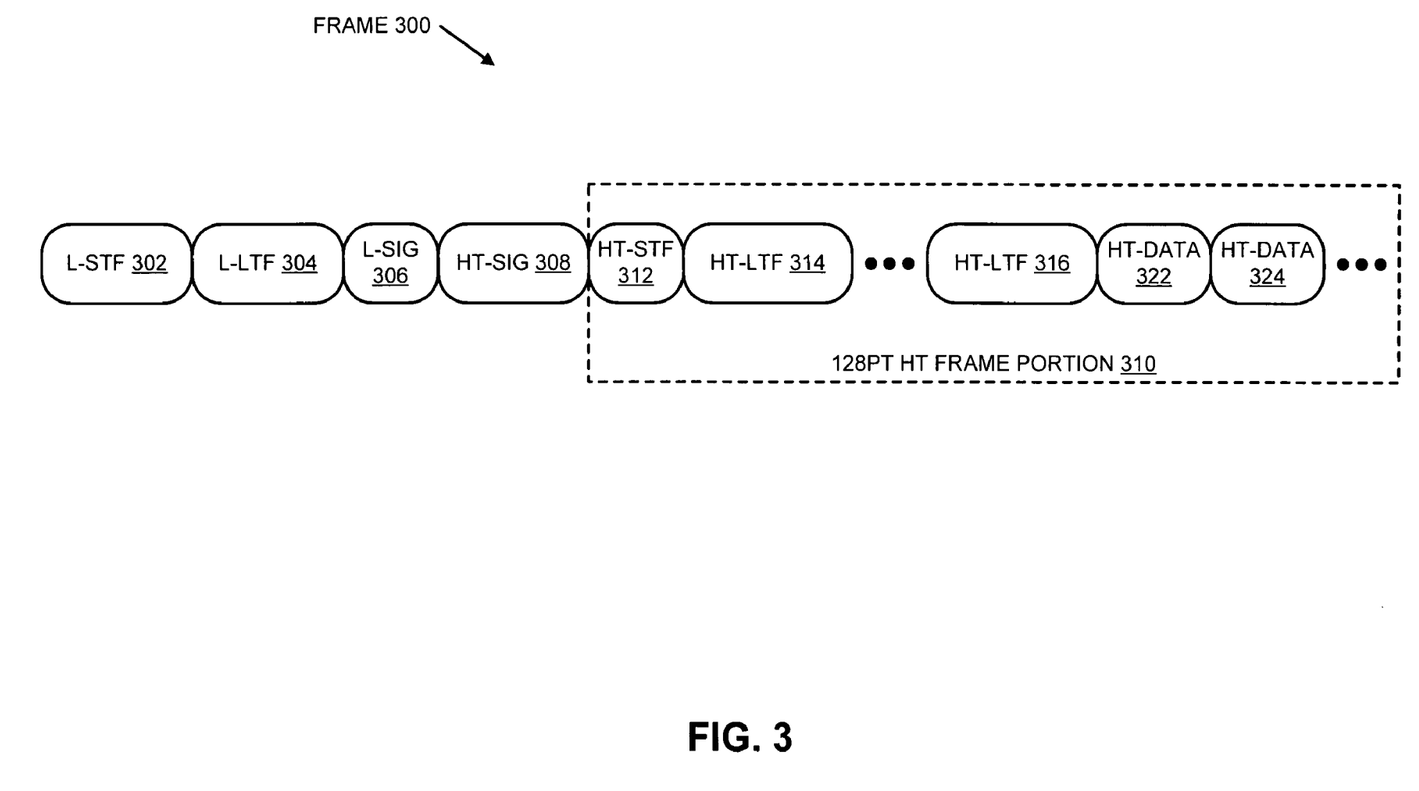
FIG. 3 is a block diagram of an embodiment of a communication frame.

FIG. 3 is a block diagram of an embodiment of a communication frame. Frame 300 represents one example of a frame that can be used in a system with extended symbol length according to any embodiment described herein. Frame 300 can be a PLCP (PHY (Physical) Layer Convergence Protocol) Protocol Data Unit (PPDU). Frame 300 includes a legacy portion to provide compatibility with legacy systems, or systems that operate at a lower bandwidth channel and a lower throughput (e.g., 802.11a/g systems). L-STF (Legacy Short Training Field) 302, L-LTF (Legacy Long Training Field) 304, and L-SIG (Legacy SIGnal field) 306 provide a frame portion necessary to legacy devices to detect packet transmission. These legacy fields also enable both legacy and other devices to perform acquisition and estimation operations (e.g., frequency offset, timing, signal strength, etc.), for participating in communication in a system.

128-subcarriers HT (High Throughput) frame portion 310 provides a high-throughput portion with 128 subcarriers in 20 MHz. HT frame portion 310 can include HT-STF 312 and HT-LTFs 314-316 for training to enable a receiving device to obtain the signal. HT frame portion 310 also includes HT-DATA fields 322-324, which represent the information of frame 300, with 128 subcarriers. HT-SIG (HT SIGnal field) 308, enables an HT-compatible device to know that an HT signal is being transmitted and can indicate that a 128-subcarrier symbol is being transmitted. HT-SIG 308 can contain a "long symbol" bit indicating 128 subcarriers in 20 MHz. In the IEEE P802.11n proposal, no such bit exists in the HT-SIG field of the proposal, but one could be added by shortening the CRC (Cyclic Redundancy Check) field of the HT-SIG field to obtain an extra bit for use as a "long symbol" indicator. Other fields within the HT-SIG field could be modified to obtain an extra bit.

The following table represents one example embodiment of a possible system implementation according to the 128-subcarrier signal in 20 MHz as described herein:

|  | 128 subcarriers Proposal |
| --- | --- |
| Data Subcarriers | 108 |
| Pilot Subcarriers | 4 |
| Null Subcarriers | 3 |
| Max FEC Rate | 5/6 |
| Peak Rate | 150 Mbps |

Figure 4:
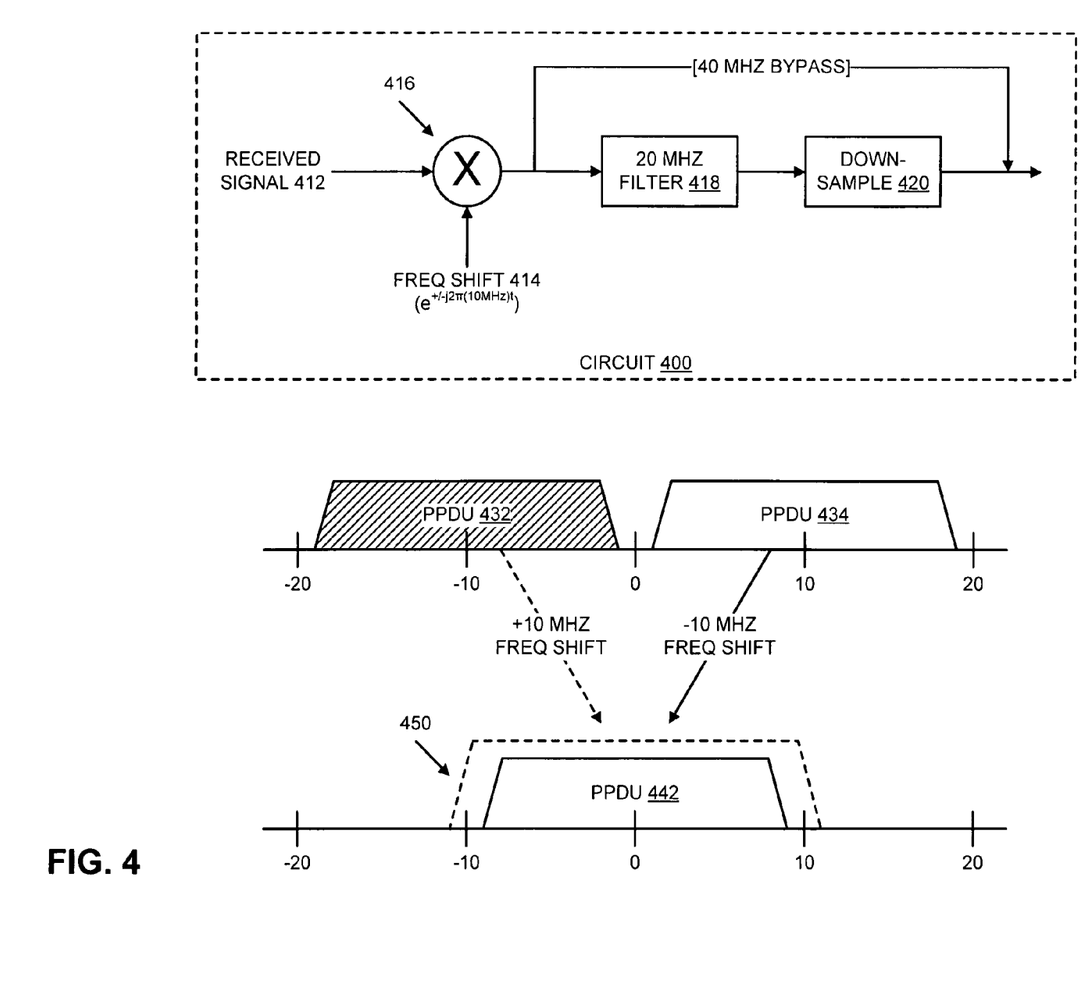
FIG. 4 is a block diagram of an embodiment of an addition circuit and an example of an operation of the addition circuit.

FIG. 4 is a block diagram of an embodiment of an addition circuit and an example of an operation of the addition circuit. Circuit 400 represents an additional circuit added to a system that could be used in devices that are enabled to operate with 2 different channel bandwidths, for example, 20 MHz and 40 MHz. Received signal 412 could be either a 20 MHz signal or a 40 MHz signal according to one system implementation. When mixed systems are employed and a system including circuit 400 operates in 20 MHz using a 128-point DFT, circuit 400 is activated. Received signal 412 is mixed in multiplier 416 with frequency shift signal 414, which may be an offset of 10 MHz in the system described. Other frequency shifts are possible.

If the received signal is 20 MHz, the signal is processed with 20 MHz filter 418 and down-sampler 420. If the received signal is 40 MHz (e.g., a pure system), 20 MHz filter 418 and down-sampler 420 are bypassed. Below circuit 400, the processing of a received signal is depicted visually. PPDUs 432 and 434 represent 20 MHz signals that could be received. The PPDUs are frequency shifted and centered on a reference frequency (e.g., 0 MHz). The resulting shifted PPDU is shown as PPDU 442. PPDU 442 can be filtered by 20 MHz filter 450 to remove unwanted or unintentional signal elements.

Figure 5A:
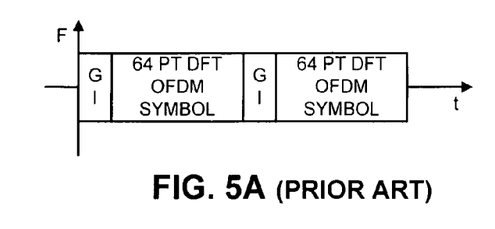
FIGS. 5A-5C are block diagrams of embodiments of OFDM symbols with guard intervals.
Figure 5B:
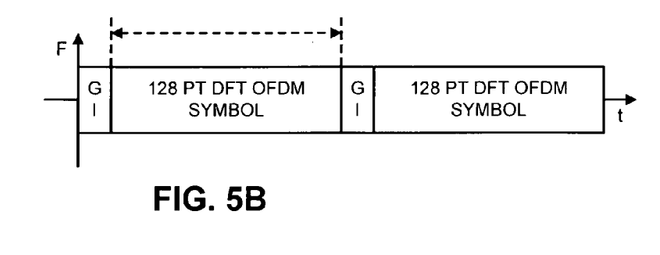
Figure 5C:
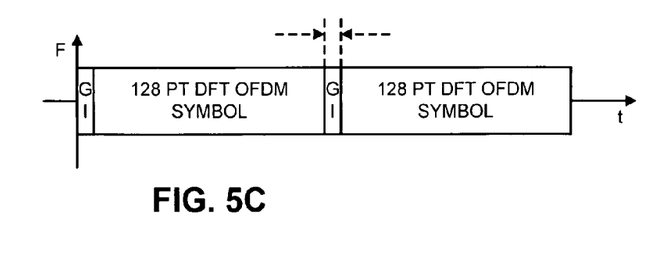

FIGS. 5A-5C are block diagrams of embodiments of OFDM symbols with guard intervals. With reference to FIG. 5A, a prior art embodiment of an OFDM symbol is shown with guard intervals, or symbol-spacing guard intervals. The OFDM symbol is a 64-point symbol with full guard intervals in 20 MHz, as would be used by next-generation Wi-Fi devices in mixed systems.

FIG. 5B represents an OFDM symbol that is extended to include twice as many points, thus providing a 128-point symbol. Even maintaining the guard interval duration as the prior art in FIG. 5A, doubling the number of subcarriers can provide an 11% throughput increase. In an embodiment according to FIG. 5C, a 128-point symbol is combined with a half-length OFDM guard interval, which can improve throughput by approximately 17.6%.

Figure 6A:
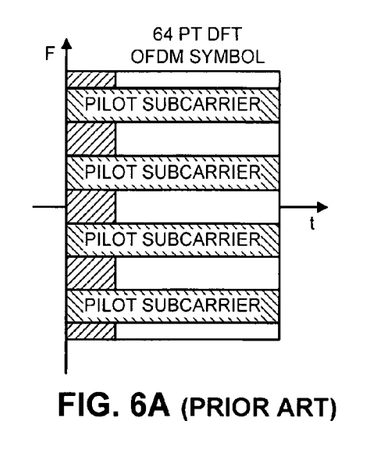
FIGS. 6A-6B are block diagrams of embodiments of OFDM symbols with pilot subcarriers.
Figure 6B:
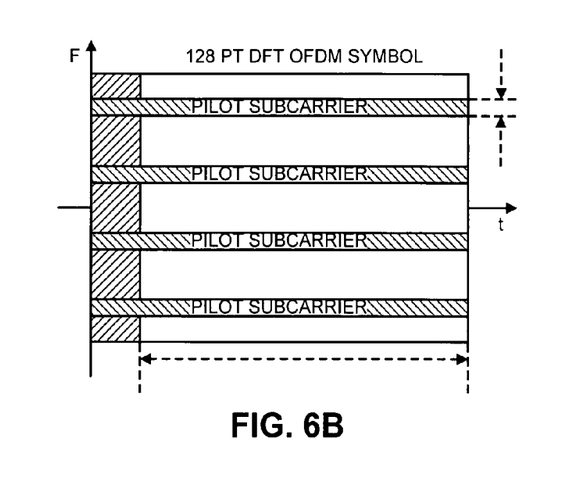

FIGS. 6A-6B are block diagrams of embodiments of OFDM symbols with pilot subcarriers. FIG. 6A represents a prior art representation of a 64-point OFDM symbol with full pilot subcarrier overhead. FIG. 6B provides an increased 128-point OFDM symbol with reduced pilot subcarrier overhead. Reducing the pilot subcarrier overhead allows increased use of available spectrum for data transmission. When using 128 subcarriers instead of 64 subcarriers, the pilot subcarrier overhead can be reduced because the spectrum occupied by each subcarrier, and in particular by the pilot subcarriers, reduces proportionally to the subcarrier number increase, provided that the number of pilot subcarriers is the same. Thus, the pilot subcarrier spectrum can be reduced and consequently pilot subcarrier overhead reduced. Combining this decrease with a decrease of guard interval overhead provides increased spectrum for data throughput.

Figure 7A:
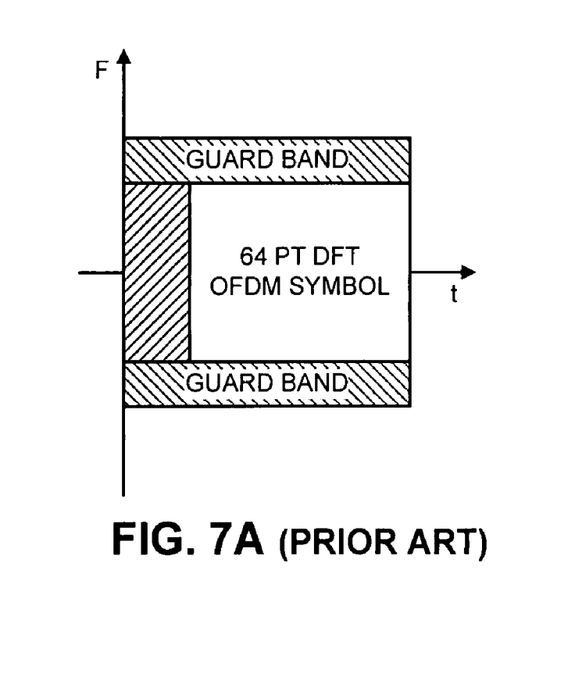
FIGS. 7A-7B are block diagrams of embodiments of OFDM symbols with guard bands.
Figure 7B:
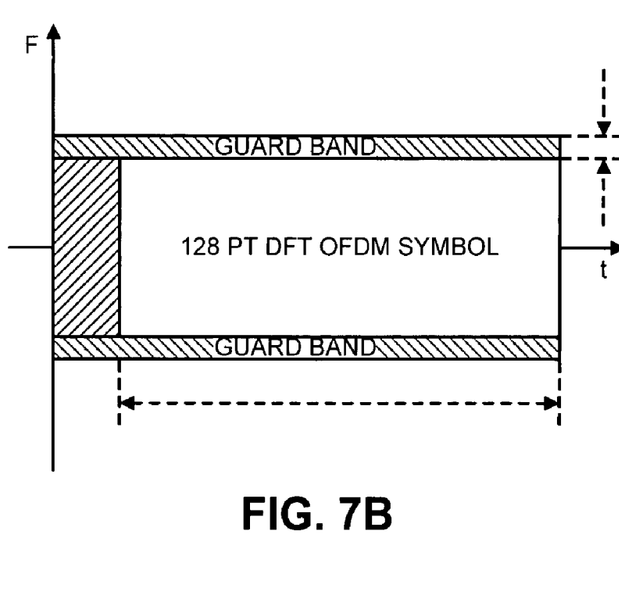

FIGS. 7A-7B are block diagrams of embodiments of OFDM symbols with guard bands. FIG. 7A represents a prior art embodiment of a 64-point symbol with full guard bands, or frequency-spacing/separating guard bands. Note that guard intervals separate one symbol from the next (temporal separation). A guard band provides a frequency buffer zone to reduce the effects of out-of-band emission (frequency separation of channels). As shown with reference to FIG. 7B, using 128 subcarriers instead of 64 subcarriers allows a system to use part of the spectral resources occupied in traditional systems by the guard bands. When using 128 subcarriers, the guard band spectrum can be reduced proportionally to the increase in the subcarrier number to provide the same level of protection against the effects of out-of-band emission. Therefore the required guard band spectrum part reduces proportionally to the increase of the subcarrier number, and provides additional spectrum resources for data transmission.

In one embodiment 108 subcarriers of the 128 subcarriers are used for data transmission, which is more than twice the 48 data subcarriers of the 64 total subcarriers of existing Wi-Fi systems. Because the overhead of both pilot subcarriers and the guard frequency bands are reduced, the increase to 108 data subcarriers can be achieved, which can improve throughput by approximately 12.5%. With the use of 128 subcarriers, 108 of which are data subcarriers, the reduction in guard intervals, guard bands, and pilot subcarrier overhead, a system as described herein can provide approximately 32% throughput improvement over traditional next-generation Wi-Fi.

Techniques described herein can be performed on components that may include hardware, software, and/or a combination of these. Software to instruct a machine to implement the techniques herein, or software to use to manufacture a device to perform the techniques described herein may be provided via an article of manufacture by a machine/electronic device/hardware. An article of manufacture may include a machine accessible/readable medium having content to provide instructions, data, etc. The content may result in an electronic device performing various operations or executions described. A machine accessible medium includes any mechanism that provides (i.e., stores and/or transmits) information/content/instructions in a form accessible by a machine (e.g., computing device, electronic device, electronic system/subsystem, etc.). For example, a machine accessible medium includes recordable/non-recordable media (e.g., read only memory (ROM), random access memory (RAM), magnetic disk storage media, optical storage media, flash memory devices, etc.), as well as electrical, optical, acoustical or other forms of propagated signals (e.g., carrier waves, infrared signals, digital signals, etc.), etc. The machine accessible medium may further include an electronic device having code loaded on a storage that may be executed when the electronic device is in operation. Thus, delivering an electronic device with such code may be understood as providing the article of manufacture with such content described above. Furthermore, storing code on a database or other memory location and offering the code for download over a communication medium via a propagated signal may be understood as providing the article of manufacture with such content described above.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. In a multi-carrier communication system having a fixed-bandwidth channel, a method comprising:
    reducing a spacing of subcarriers on the fixed-bandwidth channel;
    increasing a number of subcarriers to increase a length of a symbol on the fixed-bandwidth channel;
    transmitting with a transmitter a frame of data via the increased number of subcarriers on the fixed-bandwidth channel, the frame of data including,
        a legacy portion compatible with a first wireless communication protocol, wherein a throughput of the first wireless communication protocol is lower than a throughput of a second wireless communication protocol,
        a HT-SIG field identifying the frame of data as being transmitted via the increased number of subcarriers on the fixed-bandwidth channel, and
        a high throughput portion compatible with the second wireless communication protocol; and
    performing an inverse discrete Fourier transform with an increased number of discrete points on the symbol with the increased number of subcarriers.

2. The method of claim 1, wherein reducing the spacing of the subcarriers on the fixed-bandwidth channel comprises reducing the subcarrier spacing of the subcarriers by half.

3. The method of claim 2, wherein reducing the subcarrier spacing by half on the fixed bandwidth channel comprises reducing the subcarrier spacing by half on a 20 MHz channel.

4. The method of claim 2, wherein reducing the subcarrier spacing by half on the fixed bandwidth channel comprises reducing the subcarrier spacing in a high-throughput (HT) wireless local area network (WLAN) system.

5. The method of claim 2, wherein increasing the number of subcarriers comprises increasing the number of subcarriers from 64 to 128.

6. The method of claim 5, wherein increasing the number of subcarriers from 64 to 128 further comprises increasing the number of data subcarriers by more than double.

7. The method of claim 1, wherein performing the discrete Fourier transform with the increased number of discrete points comprises performing a 128-point IDFT (Inverse Discrete Fourier Transform) on a transmit signal.

8. The method of claim 1, further comprising reducing a temporal symbol-spacing guard interval.

9. The method of claim 1, further comprising reducing a frequency channel-spacing guard band on the fixed-bandwidth channel.

10. The method of claim 1, further comprising reducing an amount of spectrum occupied by a pilot subcarrier.

11. An article of manufacture comprising a non-transitory machine-accessible medium having content stored thereon to provide instructions to cause a machine to perform operations including:
    processing a frame of data for transmission on a fixed-bandwidth channel of a multi-carrier communication system, including generating a symbol having a format compatible with a first wireless communication protocol, the fixed-bandwidth channel having a number of subcarriers which is increased to a number specified in the first wireless communication protocol, wherein the frame of data including,
        a legacy portion compatible with a second wireless communication protocol, wherein a throughput of the second wireless communication protocol is lower than a throughput of the first wireless communication protocol,
        a HT-SIG field identifying the frame of data as being transmitted via the increased number of subcarriers on the fixed-bandwidth channel, and
        a high throughput portion compatible with the first wireless communication protocol;
    performing an inverse discrete Fourier transform with an increased number of discrete points with respect to the number specified in the first wireless communication protocol; and
    transmitting the symbol to a remote receiver.

12. The article of manufacture according to claim 11, wherein the first wireless communication protocol is compatible with a high-throughput (HT) wireless local area network (WLAN) protocol, and the increased number of subcarriers comprises 128 in a 20 MHz channel.

13. The article of manufacture according to claim 11, further comprising instructions for:
    reducing a temporal symbol-spacing guard interval; and
    reducing a frequency channel-spacing guard band on the fixed-bandwidth channel.

14. An apparatus for transmitting a signal, comprising:
    an encoder to process a frame of data for transmission on a fixed-bandwidth channel of a multi-carrier communication system, including mapping a signal to a number of subcarriers of the fixed-bandwidth channel to represent the signal in discrete points, the number of subcarriers being double a number of subcarriers defined in a first wireless communication protocol, wherein the frame of data including, a legacy portion compatible with the first wireless communication protocol, wherein a throughput of the first wireless communication protocol is lower than a throughput of a second wireless communication protocol, a HT-SIG field identifying the frame of data as being transmitted via the number of subcarriers of the fixed-bandwidth channel, and a high throughput portion compatible with the second wireless communication protocol;

an Inverse Discrete Fourier Transform (IDFT) component coupled with the encoder to transform the discrete-point signal from a frequency domain representation to a time domain representation; and a digital to analog converter (DAC) coupled with the IDFT to convert the time domain signal representation into an analog waveform to transmit to a remote receiver.

15. The apparatus of claim 14, the number of subcarriers comprising 128 subcarriers in a 20 MHz channel that is compatible with a high-throughput (HT) wireless local area network (WLAN) protocol.

16. The apparatus of claim 14, the encoder further to map the number of subcarriers to a signal representation having a reduced temporal symbol-spacing guard interval.

17. The apparatus of claim 14, the encoder further to map the number of subcarriers to a signal representation having a reduced frequency channel-spacing guard band.

18. A system comprising:
a transmitter having:
an encoder to process a frame of data for transmission on a fixed-bandwidth channel of a multi-carrier communication system, including mapping a signal to a number of subcarriers of the fixed-bandwidth channel to represent the signal in discrete points, the number of subcarriers being double a number of subcarriers defined in a first wireless communication protocol, wherein the frame of data including, a legacy portion compatible with the first wireless communication protocol, wherein a throughput of the first wireless communication protocol is lower than a throughput of a second wireless communication protocol, a HT-SIG field identifying the frame of data as being transmitted via the number of subcarriers of the fixed-bandwidth channel, and a high throughput portion compatible with the second wireless communication protocol, an Inverse Discrete Fourier Transform (IDFT) component coupled with the encoder to transform the discrete-point signal from a frequency domain representation to a time domain representation; and a digital to analog converter (DAC) coupled with the IDFT to convert the time domain signal representation into an analog waveform to transmit to a remote receiver; and a dipole antenna coupled to the transmitter to transmit the analog waveform.

19. The system of claim 18, the number of subcarriers comprising 128 subcarriers in a 20 MHz channel that is compatible with a high-throughput (HT) wireless local area network (WLAN) protocol.

20. The system of claim 18, the encoder further to map the number of subcarriers to a signal representation having a reduced temporal symbol-spacing guard interval and a reduced frequency channel-spacing guard band.

* * * * *